(12) United States Patent
Choi et al.

(10) Patent No.: US 8,434,975 B2
(45) Date of Patent: May 7, 2013

(54) DOUBLE-SIDED CUTTING INSERT AND MILLING CUTTER MOUNTING THE SAME

(75) Inventors: Chang Hee Choi, Daegu (KR); Chang Gyu Park, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 919 days.

(21) Appl. No.: 12/525,508

(22) PCT Filed: Feb. 16, 2007

(86) PCT No.: PCT/KR2007/000858
§ 371 (c)(1),
(2), (4) Date: Jul. 31, 2009

(87) PCT Pub. No.: WO2008/099984
PCT Pub. Date: Aug. 21, 2008

(65) Prior Publication Data
US 2010/0028092 A1 Feb. 4, 2010

(51) Int. Cl.
*B23B 27/22* (2006.01)
*B23C 5/20* (2006.01)
(52) U.S. Cl.
USPC ............ 407/114; 407/113; 407/100; 407/115
(58) Field of Classification Search .................. 407/113, 407/114, 100, 102, 103, 115; *B23C 5/20; B23B 27/16*
See application file for complete search history.

(56) References Cited

U.S. PATENT DOCUMENTS

| | | | |
|---|---|---|---|
| 3,464,098 A | 9/1969 | Moore et al. | |
| 3,670,380 A | 6/1972 | Moore et al. | |
| 4,915,548 A | * 4/1990 | Fouquer et al. | 407/114 |
| 4,934,879 A | * 6/1990 | van Barneveld | 407/66 |
| 4,988,242 A | * 1/1991 | Pettersson et al. | 407/114 |
| 5,074,720 A | * 12/1991 | Loqvist et al. | 407/114 |

(Continued)

FOREIGN PATENT DOCUMENTS
BE 675 526 7/1966
JP 6-297224 10/1994
(Continued)

OTHER PUBLICATIONS

Office Action dated Jun. 16, 2011 issued in corresponding Korean application No. 10-2009-7017784.

(Continued)

*Primary Examiner* — Andrea Wellington
*Assistant Examiner* — Sara Addisu
(74) *Attorney, Agent, or Firm* — Womble Carlyle

(57) ABSTRACT

A double-sided milling cutting insert has usable upper and lower faces. The upper face has a polygonal shape with curved edges. The lower face has a rotationally symmetrical relation to the upper face. Flank faces connect edges of the upper face to corresponding edges of the lower face. Upper cutting edges are formed on one of the edges of the upper face. The upper chip-forming portions have rake faces inclined downwardly from the upper cutting edges inwardly of the cutting insert and a plurality of protrusions arranged along inner boundaries of the rake faces for deflecting chips. When the cutting insert is mounted on the cutting tool, a width of the rake face of the upper chip-forming portion adjacent to an edge portion forming a main cutting edge gradually increases in a direction going away from a rotational axis of the cutting tool.

11 Claims, 11 Drawing Sheets

U.S. PATENT DOCUMENTS

| | | | | |
|---|---|---|---|---|
| 5,116,167 A | * | 5/1992 | Niebauer | 407/114 |
| 5,282,703 A | * | 2/1994 | Itaba et al. | 407/114 |
| 5,630,681 A | * | 5/1997 | Paya | 407/114 |
| 5,743,681 A | * | 4/1998 | Wiman et al. | 407/114 |
| 5,758,994 A | * | 6/1998 | Hintze et al. | 407/116 |
| 5,807,031 A | * | 9/1998 | Arai et al. | 407/113 |
| 6,116,824 A | | 9/2000 | Strand et al. | |
| 6,186,705 B1 | * | 2/2001 | Kumar et al. | 407/114 |
| 6,599,061 B1 | * | 7/2003 | Nelson | 407/114 |
| 6,786,682 B1 | * | 9/2004 | Wiman | 407/114 |
| 6,957,935 B2 | | 10/2005 | Sung et al. | |
| 7,118,312 B2 | | 10/2006 | Norström et al. | |
| 7,182,555 B2 | * | 2/2007 | Kitagawa et al. | 407/113 |
| 7,513,717 B2 | * | 4/2009 | Engstrom et al. | 407/113 |
| 7,604,441 B2 | * | 10/2009 | Bhagath | 407/113 |
| 7,976,251 B2 | * | 7/2011 | Iyori et al. | 407/114 |
| 2005/0169716 A1 | * | 8/2005 | Smilovici et al. | 407/113 |
| 2005/0254909 A1 | * | 11/2005 | Krahula et al. | 407/114 |
| 2007/0003384 A1 | * | 1/2007 | Smilovici et al. | 407/113 |
| 2011/0293383 A1 | * | 12/2011 | Kaufmann et al. | 407/114 |
| 2012/0087751 A1 | * | 4/2012 | Yamaguchi | 407/115 |

FOREIGN PATENT DOCUMENTS

| | | |
|---|---|---|
| JP | 08-505817 | 6/1996 |
| JP | 8-323510 | 12/1996 |
| JP | 9-103909 | 4/1997 |
| JP | 10-138029 A | 5/1998 |
| KR | 10-0305458 B1 | 11/2001 |
| KR | 2002-0017226 A | 3/2002 |
| KR | 10-2006-0102398 | 9/2006 |
| KR | 10-2006-0135212 | 12/2006 |
| WO | WO 94/16851 A1 | 8/1994 |
| WO | WO 99/36217 | 7/1999 |
| WO | WO 02/18083 | 3/2002 |

OTHER PUBLICATIONS

International Search Report in PCT/KR2007/000858, dated Nov. 9, 2007.

Written Opinion in PCT/KR2007/000858; dated Nov. 9, 2007.

Search Report in counterpart Chinese published application No. 101610867 101 (Search Report found on 1st page of publication).

Extended European Search dated Apr. 12, 2011 issued in corresponding EP Application No. 07709008.2.

Official action dated Jan. 6, 2012 issued in Japanese counterpart application (No. 2009-549506).

* cited by examiner 44a  44b

DOUBLE-SIDED CUTTING INSERT AND MILLING CUTTER MOUNTING THE SAME

TECHNICAL FIELD

The present invention generally relates to double-sided cutting inserts, and more particularly to a double-sided cutting insert suitable for use in a milling cutter.

BACKGROUND ART

In milling operations, a method of cutting a workpiece by increasing a feed rate (feed distance per tooth) of a milling cutter has been recently introduced.

FIGS. 1 to 3 illustrate variations of feed rates according to various entering angles. As shown in FIGS. 1 to 3, as the entering angles become smaller, a radial load transmitted from a workpiece vertically to an axis of a cutting tool (milling cutter) also becomes smaller accordingly. That is, since the load acting in a vertical direction of the milling cutter axis is reduced as the entering angle becomes smaller, the fluctuation of the milling cutter and the impact caused thereby against cutting edges are reduced, thereby lengthening the service lives of the cutting edges compared to a conventional milling process.

Furthermore, since the feed rate is high when setting the entering angle to be relatively small over a large entering angle, the amount of removed workpiece per rotation of the milling cutter is increased. Thus, the processing efficiency can be raised by processing the workpiece through the milling process of setting the entering angle to be small. As such, a recent milling process adopts the cutting method of setting the entering angle to be small.

FIG. 4 is a perspective view of a conventional cutting insert, which is mounted to a milling cutter. FIG. 5 is a side view of the conventional cutting insert. FIG. 6 illustrates a milling cutter with the conventional cutting insert mounted thereto. As shown in FIGS. 4 and 5, an upper face 15 of the cutting insert 10 is flat, while edges of the upper face 15 function as cutting edges 12. The cutting edge 12 of the cutting insert 10 is generally formed to have a prescribed radius of curvature. Since the cutting edge 12 has a prescribed radius of curvature instead of a straight shape, chips generated while processing a workpiece become thick as they are disposed away from an axis of the milling cutter 11.

As described above, when processing a workpiece at a small entering angle in the milling operations, a large amount of workpiece is removed per rotation of the milling cutter. Accordingly, a high cutting resistance is applied to the cutting insert. In order to reduce the cutting resistance applied to the cutting insert, the cutting insert is mounted to the milling cutter such that the upper face 15 of the cutting insert has a positive rake angle with respect to the axis of the milling cutter 11, as shown in FIG. 6. Further, in order to avoid any friction between a flank face 16 of the cutting insert and a processing surface of the workpiece, a clearance angle is placed between the flank face 16 and the processing surface of the workpiece. Thus, the conventional cutting insert used in the milling operation, wherein the entering angle is set to be small, has a shape such that an area of the upper face 15 is larger than that of a lower face 17, as shown in FIGS. 4 and 5. The cutting insert 10 can be secured to the milling cutter 11 such that the lower face 17 is contacted to a support surface of the milling cutter, wherein a screw is then inserted through a hole 13 formed at a central portion of the cutting insert 10.

Such a conventional cutting insert is permitted to use only one face thereof (i.e., upper face) when cutting the workpiece. The reasons why both faces cannot be used in the conventional cutting insert are as follows. In order to use the lower face of the cutting insert, which is secured to the support surface of the milling cutter, in processing the workpiece, the cutting insert must be turned upside down and the upper face thereof must be secured to the support surface of the milling cutter. In such a case, since the upper face of the cutting insert was already significantly damaged due to collision with chips during processing the workpiece, it cannot be uniformly contacted to the support surface of the milling cutter. Thus, since the cutting insert cannot be firmly secured to the support surface of the milling cutter, considerable fluctuations can be generated during processing the workpiece. Further, since the conventional cutting insert is mounted to the milling cutter so as to form a positive rake angle, the lower face of the cutting insert has a smaller area than the upper face of the cutting insert to prevent the flank face from being contacted to the workpiece (see FIGS. 4 and 5). Thus, even if other cutting edges are formed between the lower face and the flank faces of the cutting insert, when the upper face of the cutting insert is secured to the support surface of the milling cutter, the cutting edge formed at the lower face of the cutting insert cannot be contacted to the processing surface of the workpiece.

When cutting edges have a prescribed radius of curvature similar to those of conventional cutting inserts, generated chips become thicker as they are located away from the axis of the milling cutter. Further, as the chips become thicker, the cutting resistance applied to the cutting insert also becomes higher. Accordingly, a portion of the cutting insert portion, to which the higher cutting resistance is applied, is worn out faster than other portions of the cutting insert. As such, a life span of the cutting insert is significantly reduced.

SUMMARY OF THE INVENTION

It is an object of the present invention to provide a cutting insert capable of using both upper and lower faces thereof while increasing a life span of the cutting insert by reducing a difference in a cutting resistance in a lengthwise direction of the cutting edge, thereby solving the foregoing problems of the prior art.

In order to achieve the above objects and other objects, a double-sided cutting insert of the present invention comprises an upper face, a lower face, a plurality of flank faces, a plurality of upper cutting edges, a plurality of lower cutting edges, a plurality of upper chip-forming portions and a plurality of lower chip-forming portions. The upper face has a polygonal shape with curved edges. The lower face has a rotationally symmetrical relation to the upper face. The flank face connects one of the edges of the upper face to a corresponding edge of the lower face, respectively. Each upper cutting edge is formed on each of the edges of the upper face. Further, each lower cutting edge is formed on each of the edges of the lower face. Each of the upper chip-forming portions has a rake face inclined downwardly from the upper cutting edge inwardly of the cutting insert and a plurality of protrusions arranged along an inner boundary of the rake face for deflecting the chips. Each of the lower chip-forming portions has a rake face inclined downwardly from the lower cutting edge inwardly of the cutting insert and a plurality of protrusions arranged along an inner boundary of the rake face for deflecting the chips. When the cutting insert is mounted to a cutting tool, a width of the rake face of the upper chip-forming portion adjacent to an edge portion forming a main cutting edge becomes gradually large in a direction going away from an axis of the cutting tool.

A rake angle of the rake face of the upper chip-forming portion becomes gradually large from a narrow-width portion of the rake face toward a wide-width portion of the rake face.

The rake angle of the rake face of the upper chip-forming portion becomes gradually large from a narrow-width portion of the rake face toward a wide-width portion of the rake face, i.e., from 15° to 25°.

The upper and lower faces of the cutting insert have a triangular shape.

A milling cutter of the present invention comprises the above-described cutting insert and a cutter body having pocket portions for mounting the cutting insert. The pocket portion includes a support surface corresponding to a mounting surface of the cutting insert. The support surface has a larger area at a portion disposed away from an axis of the cutter body compared to a portion adjacent to the axis of the cutter body. The cutting insert is mounted to be inclined in a negative direction with respect to the axis of the cutter body.

DETAILED DESCRIPTION

The constitution of a cutting insert in accordance with one embodiment of the present invention will now be described with reference to the accompanying drawings.

Figure 7:
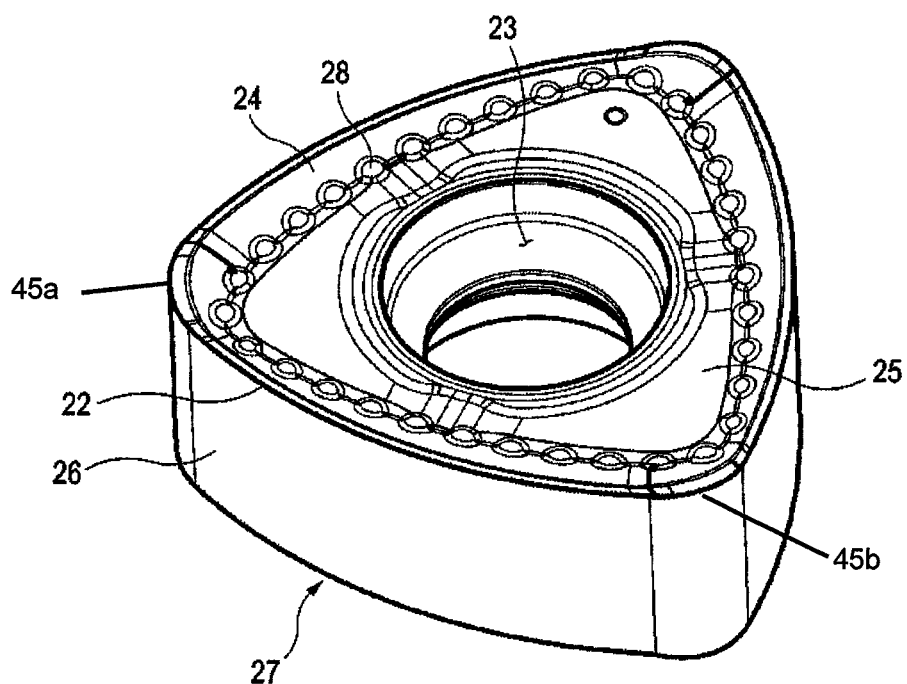
FIG. 7 is a perspective view of a cutting insert in accordance with one embodiment of the present invention.
Figure 8:
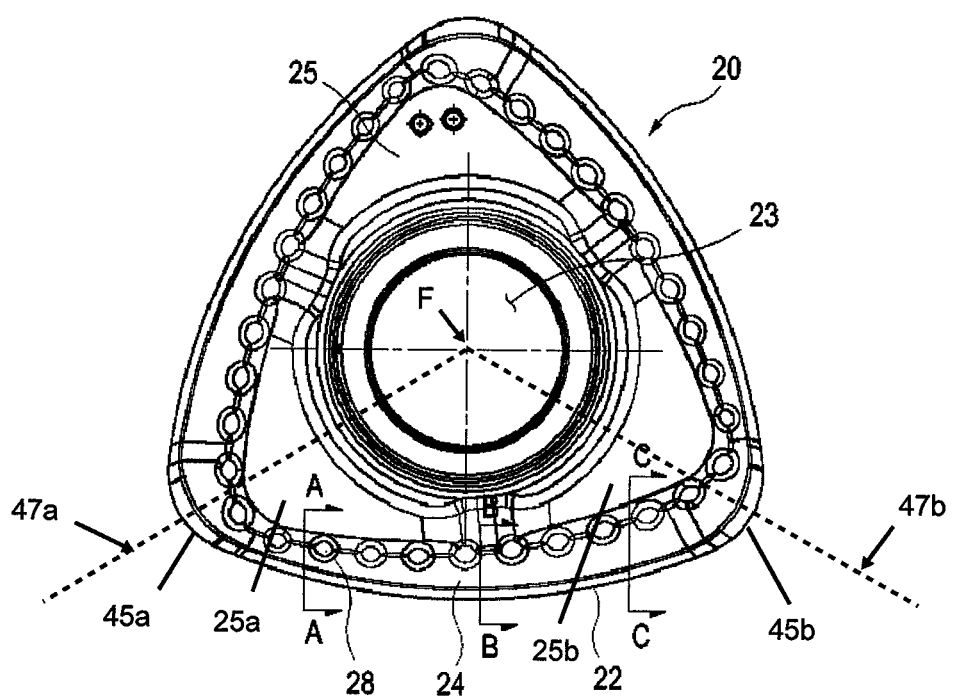
FIG. 8 is a plan view of the cutting insert in accordance with one embodiment of the present invention.
Figure 9:
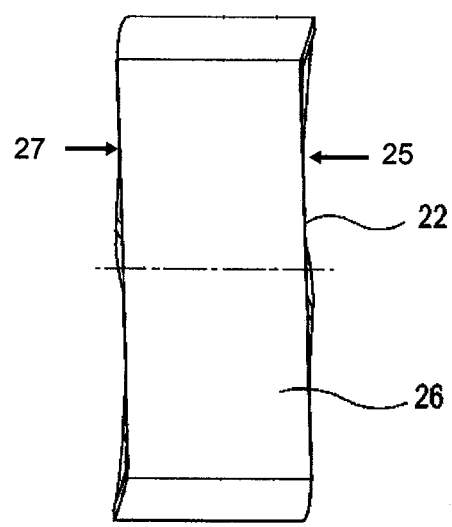
FIG. 9 is a side view of the cutting insert in accordance with one embodiment of the present invention.
Figure 10:
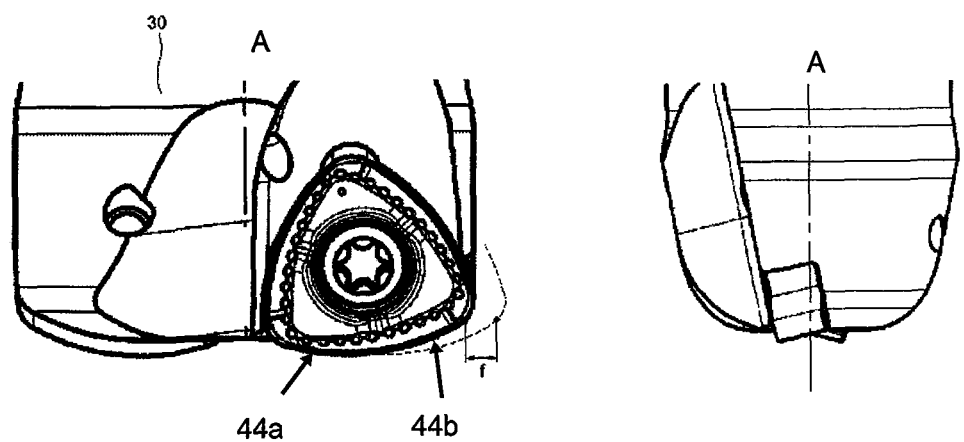
FIG. 10 illustrates a milling cutter with the cutting insert in accordance with one embodiment of the present invention mounted thereto.

FIG. 7 is a perspective view of a double-sided cutting insert 20 in accordance with one embodiment of the present invention. FIG. 8 is a plan view of the cutting insert. FIG. 9 is a side view of the cutting insert. FIG. 10 illustrates a milling cutter with the cutting insert mounted thereto. Referring to FIG. 7, the cutting insert 20 constructed in accordance with the present invention comprises an upper face 25, a lower face 27 and a plurality of flank faces 26. The upper face 25 of the cutting insert has a polygonal shape with curved edges. Preferably, it has a trigonal shape. The lower face 27 has a rotationally symmetrical relation to the upper face 25, i.e., the lower face is identical to the upper face, upon turning the insert upside down or "flipping" it. The edges of the upper face 25 and the edges of the lower face 27 are connected by the flank faces 26. The edges of the upper face 25 are formed with upper cutting edges 22, each of which extends between a first corner edge 45a and a second corner edge 45b, the second corner edge 45b being counterclockwise around the through bore 23 of the cutting insert relative to the first corner edge 45a, in a plan view of the cutting insert. Also, the edges of the lower face 27 are formed with lower cutting edges. It is preferable that the flank faces 26 of the cutting insert 20 are vertical, i.e., perpendicular, to the upper face 25 and the lower face 27. However, it should be noted that the present invention is certainly not limited thereto. There are provided upper chip-forming portions, which have rake faces 24 inclined downwardly from the upper cutting edges 22 inwardly of the cutting insert 20 and a plurality of protrusions 28 arranged along inner boundaries of the rake faces 24 for deflecting chips. Similarly, when the cutting insert 20 is turned upside down so that its lower face faces upwardly, there are provided lower chip-forming portions, which have rake faces inclined downwardly from the lower cutting edges inwardly of the cutting insert 20 and a plurality of protrusions arranged along inner boundaries of said rake faces for deflecting chips. The cutting edges 22 are formed so as to have a prescribed radius of curvature. A central portion of the cutting insert 20 is formed with a through bore 23, into which a screw is inserted to secure the cutting insert to a milling cutter.

A width (i.e., a distance between the cutting edge and the protrusions) of each rake face 24 of the cutting insert at each cutting edge 22 increases as it proceeds counterclockwise about the through bore 23 of the central portion of the cutting insert, as shown in FIG. 8 and FIGS. 11-13. In other words, when the cutting insert 20 is mounted to the milling cutter 30, the width of the rake face 24 of the upper chip-forming portion, which is adjacent to an edge portion forming a main cutting edge (i.e., a cutting edge for processing a workpiece), gradually increases in a direction going away from a rotational axis A of the milling cutter (see FIG. 10). Thus, a narrow-width portion 44a of the rake face 24 is located so as to be close to the rotational axis A of the milling cutter 30, whereas a wide-width portion 44b of the rake face 24 is located far away from the rotational axis A of the milling cutter 30. As seen in FIG. 8, a given cutting edge 22 extends between first and second corner edges 45a, 45b which are bisected by imaginary first and second lines 47a, 47b, respectively, which emanate from the cutting insert's indexing axis F. Since the width of each rake face 24 increases as it proceeds counterclockwise from its first corner edge 45a to its second corner edge 45b, the first upper face portion 25a proximate the first corner edge 45a associated with a given cutting edge 22 has a larger surface area than the second upper face portion 25b proximate the second corner edge 45b associated with that same cutting edge 22.

Figure 11:
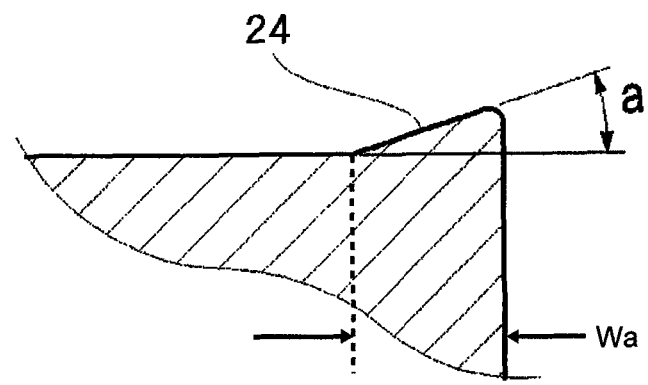
FIG. 11 is a cross-sectional view of the cutting insert taken along the line A-A of FIG. 8.
Figure 12:
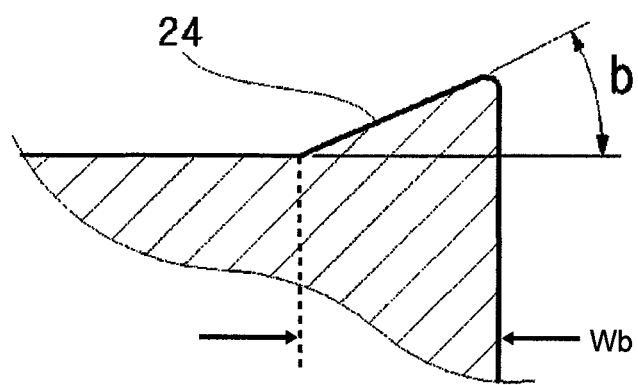
FIG. 12 is a cross-sectional view of the cutting insert taken along the line B-B of FIG. 8.
Figure 13:
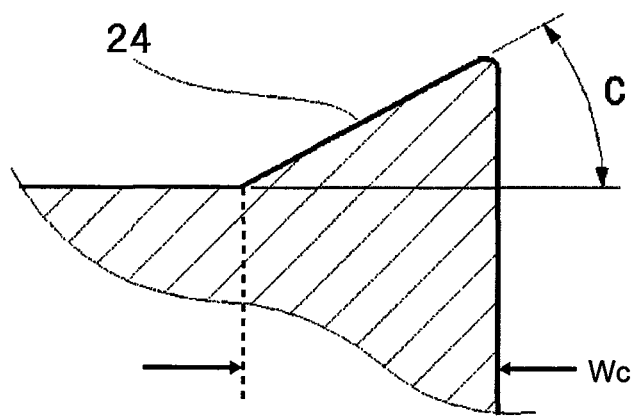
FIG. 13 is a cross-sectional view of the cutting insert taken along the line C-C of FIG. 8.

FIGS. 11 to 13 are cross-sectional views showing the rake face of the cutting insert according to the present invention. Referring to FIGS. 11 to 13, a rake angle between the rake face 24 of the cutting insert 20 and a plane surface of the upper face 25 of the cutting insert 20 gradually changes from a narrow-width portion 44a of the rake face 24 toward a wide-width portion 44b thereof. That is, the rake angles between the rake faces and the plane surface of the upper face increase from 0° to 35° (preferably, from 15° to 25°) from narrow-width portions of the rake faces 24 toward wide-width portions of the rake faces. Thus, in FIGS. 11 to 13, rake angles a, b and c, respectively, increase from a narrow-width portion 44a of the rake face 24 toward a wide-width portion 44b thereof such that a <b <c. Similarly, the rake widths Wa, Wb and Wc corresponding to the rake angles a b c respectively also increase from the narrow-width portion 44a of the rake face 24 toward the wide-width portion 44b, such that Wa<Wb<Wc.

Figure 1:
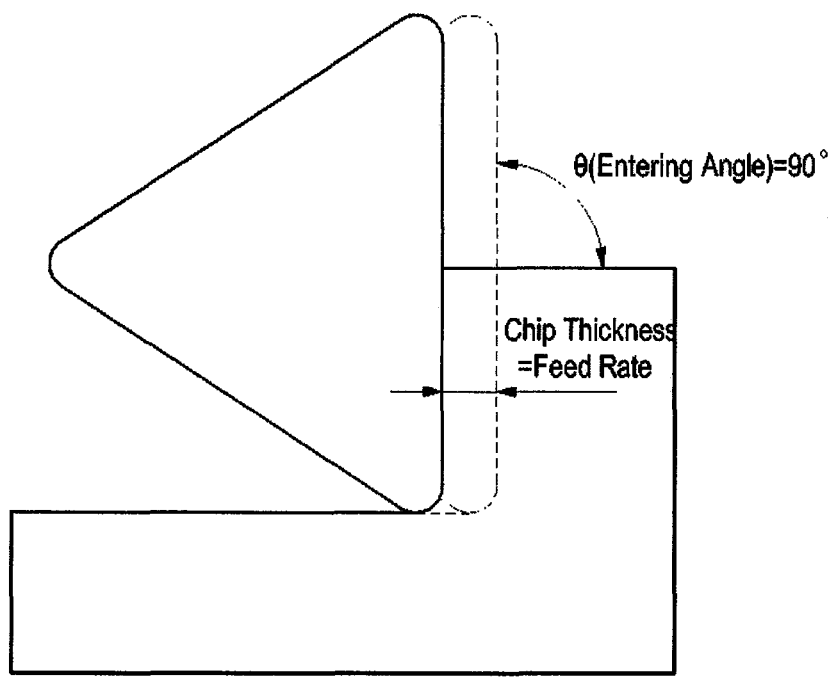
FIGS. 1 to 3 illustrate variations of feed rates according to various entering angles.
Figure 2:
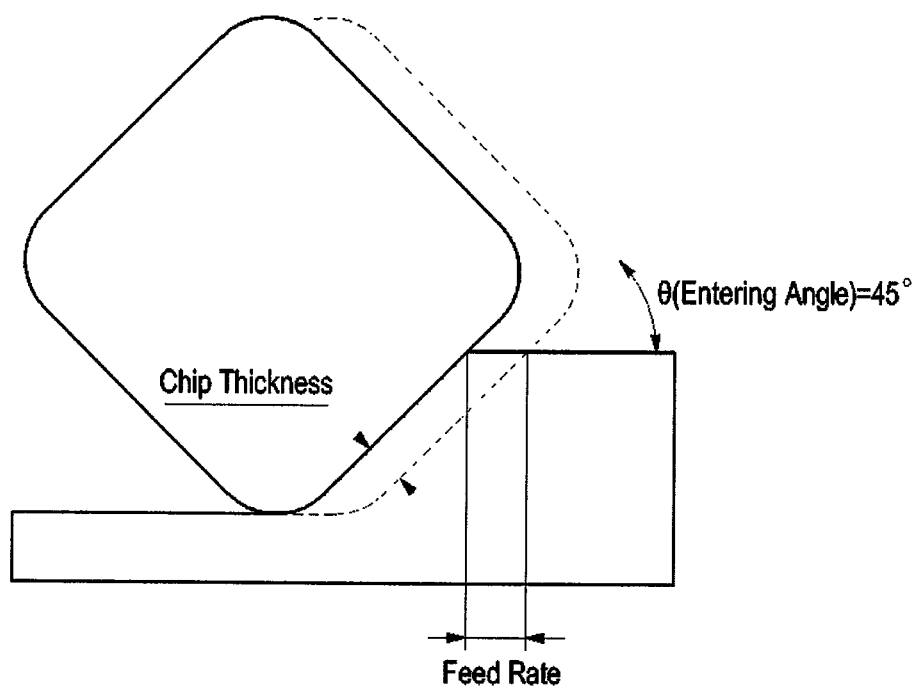
Figure 3:
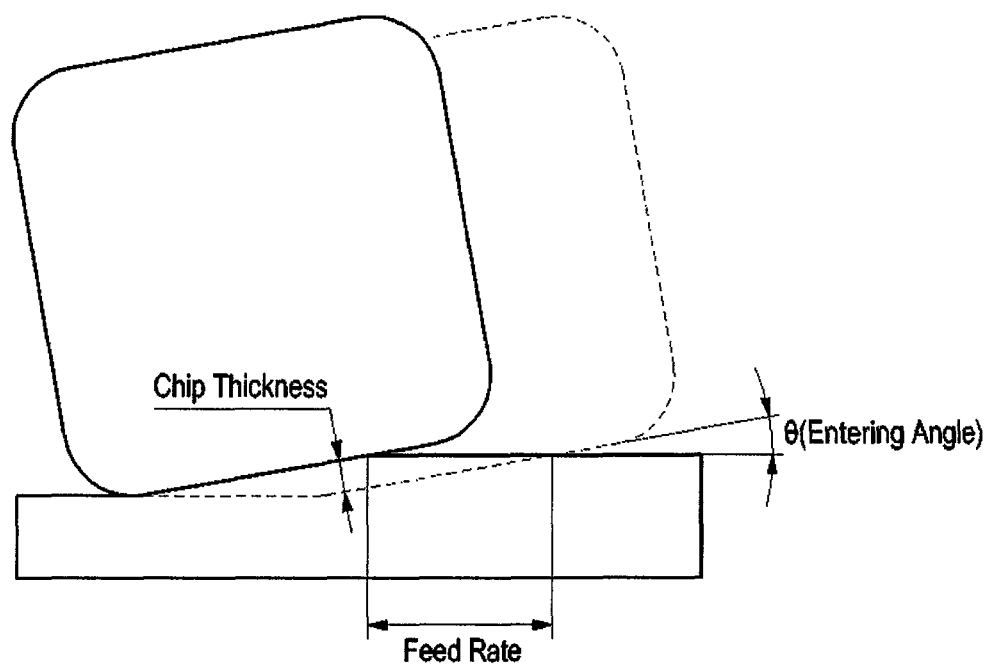
Figure 4:
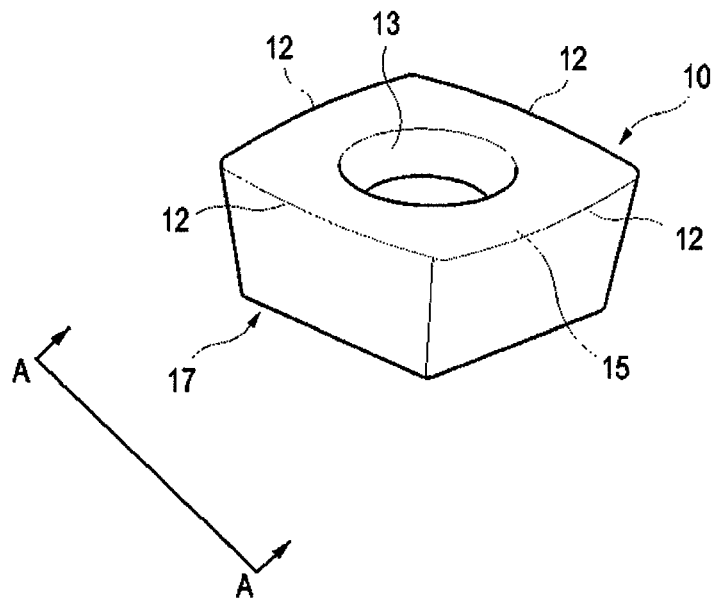
FIG. 4 is a perspective view illustrating a conventional cutting insert used in a milling operation.
Figure 5:
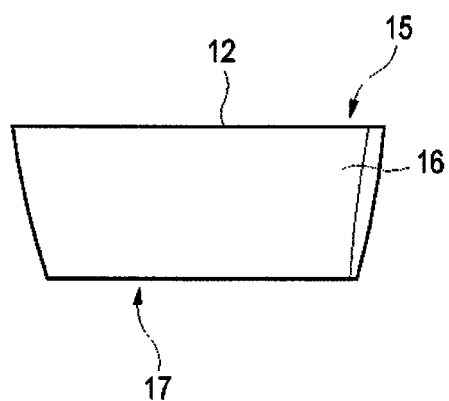
FIG. 5 is a side view of the conventional cutting insert used in a milling operation.
Figure 6:
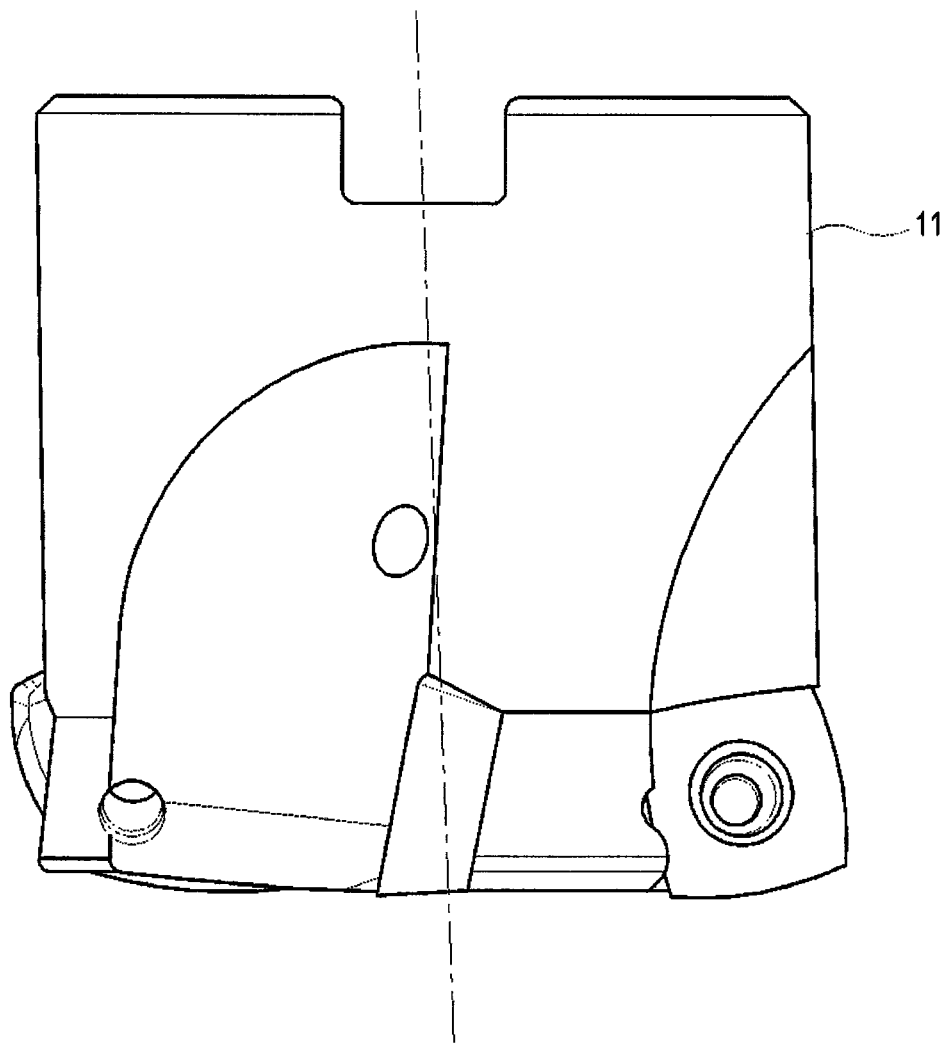
FIG. 6 illustrates a milling cutter with the cutting insert of FIG. 4. mounted thereto.
Figure 14:
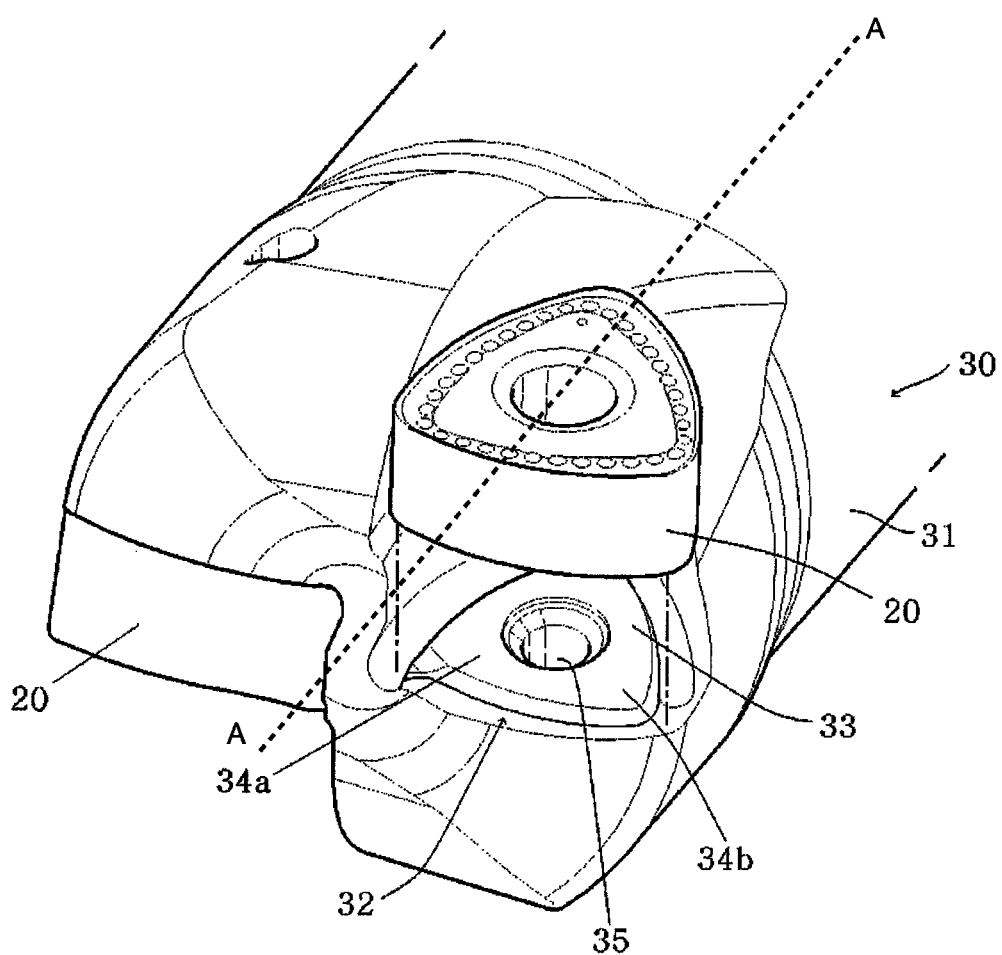
FIG. 14 illustrates the cutting insert in accordance with one embodiment of the present invention and a support surface of a milling cutter to which the cutting insert is mounted.

FIG. 14 illustrates the cutting insert of the present invention and a support surface of a milling cutter to which the cutting insert is mounted. Referring to FIG. 14, the milling cutter 30 includes a rotational axis A, a cutter body 31 and pocket portions 32 for mounting the cutting insert 20. The pocket portion 32 is formed with a support surface 33. The support surface 33 has a shape corresponding to a plane surface of the lower face of the cutting insert 20. When the cutting insert 20 of the present invention is mounted to the milling cutter 30, the lower face of the cutting insert is brought into contact with the support surface 33 of the milling cutter 30, while the rake faces of the cutting insert are placed outside the support surface 33 of the milling cutter 30. Further, the cutting insert 20 is secured to the milling cutter 30 by a screw inserted into the through bore 23 formed at the central portion of the cutting insert 20 as well as a hole 35 in the pocket portion 32 of the cutter body 31. When the cutting insert according to the present invention is mounted to the milling cutter, the cutting insert is slanted at 5° to 15° in a negative direction with respect to the axis A of the milling cutter 30, unlike the conventional cutting insert shown in FIGS. 4 and 5. Thus, the flank face 26 of the cutting insert 20 is not permitted to contact a processing surface of a workpiece and a clearance angle is formed between the flank face 26 of the cutting insert and the processing surface of a workpiece.

Furthermore, the rake faces 24 are inclined from the cutting edges 22 of the cutting insert 20 toward the central portion thereof, although the cutting insert 20 is slantingly mounted in a negative direction with respect to the axis of the milling cutter 30. Thus, the rake faces 24 of the cutting insert 20 have a positive rake angle with respect to the axis of the milling cutter 30. As such, cutting resistance applied from the workpiece to the cutting insert can be reduced.

Further, since the cutting edges 22 have a prescribed radius of curvature instead of a straight shape as described above, the chips generated while processing a workpiece become thick when they are away from the axis A of the milling cutter. Where the cutting insert 20 is mounted to the milling cutter 30, the width of the rake face 24 of the chip-forming portion, which is adjacent to an edge portion forming a main cutting edge, increases as it goes outwardly away from the axis A of the milling cutter 30. Also, a plurality of protrusions 28 are arranged along the inner boundary of the rake face 24.

Thus, thinner chips generated at a position adjacent to the axis A of the milling cutter 30 flow along the relatively narrow rake face 24 and then collide against the protrusions 28 to thereby deflect. However, thicker chips generated at a position away from the axis A of the milling cutter 30 flow along the relatively wide rake face 24 and then collide against the protrusions 28 to thereby deflect. That is, the thinner chips are allowed to be curled at relatively small radiuses, whereas the thicker chips are allowed to be curled at relatively large radiuses. As such, although the chips become gradually large in a direction going away from the axis A of the milling cutter, the chips can smoothly deflect by gradually increasing the width of the rake face 24 in a direction going away from the axis A of the milling cutter and arranging the protrusions 28 along the inner boundary of the rake face. Thus, it is possible to prevent the relatively thicker chips from damaging the plane surface of the cutting insert as well as a yet unused cutting edge 22 after they do not deflect and flow along the protrusions 28.

As mentioned above, the yet unused cutting edge is not damaged by the chips while processing a workpiece by means of the main cutting edge 22. Thus, even when the main cutting edge of the cutting insert 20 is worn out due to workpiece processing, workpiece processing can proceed by using the yet unused cutting edge of the cutting insert. In other words, when the main cutting edge of the cutting insert 20 is worn out, other unused cutting edges can be used as the main cutting edge by unfastening the screw securing the cutting insert 20 to the milling cutter, rotating the cutting insert 20 with respect to the milling cutter and then securing the cutting insert 20 again by the screw. Furthermore, since the chips generated due to workpiece processing smoothly deflect irrespective of their thicknesses, the plane surface of the upper face 25 of the cutting insert is also not damaged. As such, when all of the cutting edges 22 of the upper face 25 of the cutting insert 20 are used, the cutting edges 22 formed on the lower face 27 of the cutting insert can be used by turning the cutting insert 20 upside down and joining the upper face 25 to the support surface 33 of the milling cutter.

As can be seen from FIG. 14, when the upper face 25 of the cutting insert 20 is used to process a workpiece and a plane surface of the lower face 27 of the cutting insert contacts the support surface 33, the width of the rake face of the lower chip-forming portion of the lower face 27 of the cutting insert 20 gradually decreases in a direction going away from the axis of the milling cutter. In other words, the plane surface of the lower face 27 of the cutting insert 20 has a larger area at a portion away from the axis of the milling cutter 30 than a portion adjacent thereto. Similarly, an area of a support surface portion 34b away from the axis A of the milling cutter is larger than that of a support surface portion 34a adjacent to the axis A of the milling cutter. Thus, since the support surface 33 of the milling cutter 30 and the plane surface of the lower face 27 of the cutting insert can be sufficiently contacted to each other over a larger area at a region where chips are generated thickly (i.e., a portion away from the axis of the milling cutter), the cutting insert 20 is allowed to be stably secured to the support surface 33 of the milling cutter 20.

As discussed above, the cutting resistance against the cutting insert at a portion where chips generated by processing a workpiece become thicker becomes larger than that at a portion where the generated chips become relatively thinner. According to the present invention, the rake angle between the rake face 24 adjacent to the cutting edge 22 for processing a workpiece and the plane surface of the upper face of the cutting insert increases in a direction going away from the axis of the milling cutter 30. Thus, an angle between the rake face 24 of the cutting insert 20 and a processing surface of a workpiece decreases in a direction going away from the axis of the milling cutter. As such, since the cutting resistance applied from a workpiece to the cutting insert can be further offset as it proceeds in a direction going away from the axis of the milling cutter, the difference in the cutting resistance in a lengthwise direction of the cutting edge 22 is reduced and wear of the cutting edge 22 uniformly takes place. This enhances the service life of the cutting insert 20.

While the present invention has been particularly shown and described with reference to exemplary embodiments thereof, it will be understood by those of ordinary skill in the art that various alternations or modifications may be made without departing from the scope of the present invention;

According to the constitution of the double-sided cutting insert of the present invention, the chip-forming portion of the cutting insert is formed with rake faces. Further, a plurality of the protrusions for deflecting chips is arranged along the inner boundaries of the rake faces. Also, the width of the rake face becomes larger in a direction going away from the axis of the milling cutter. Thus, as the widths of the generated chips become larger, the radiuses of chip curling become larger accordingly, thereby allowing the chips to be smoothly curled. As such, the generated chips do not damage the plane surface of the upper face of the cutting insert as well as the yet unused cutting edge after flowing along the protrusions. Since the yet unused cutting edge is not damaged by the generated chips, the unused cutting edge can be used as another main cutting edge after the main cutting edge is worn out. Furthermore, the plane surface of the upper face of the cutting insert is not damaged by the generated chips. Hence, when all of the cutting edges of the upper face of the cutting insert are worn out, the cutting edges of the lower face of the cutting insert can be used to processing workpieces by turning the cutting insert upside down and then securing the undamaged plane surface of the upper face of the cutting insert to the support surface of the milling cutter.

Further, the upper face (lower face) of the cutting insert is formed with the rake faces. Thus, when the cutting insert is slantingly mounted in a negative direction with respect to the axis of the milling cutter to place a clearance angle between the flank face of the cutting insert and the processing surface of a workpiece in a milling operation, a positive rake angle capable of decreasing a cutting resistance is placed between the rake face of the cutting insert and the axis. of the milling cutter. Accordingly, the double-sided cutting insert according to the present invention can be used in a milling process such as a high feed rate milling, wherein a cutting resistance is relatively high due to a small-set entering angle.

Where the cutting insert of the present invention is mounted to the milling cutter, the width of the rake face of a face contacted to the support surface of the milling cutter (i.e., lower face) becomes small in a direction going away from the axis of the milling cutter. Thus, the plane surface of the lower face of the cutting insert and the support surface of the milling cutter are permitted to be contacted to each other over the largest area at a portion where a cutting resistance applied to the cutting insert is highest due to thickly generated chips (i.e., a portion of the cutting insert farthest away from the axis of the milling cutter). Accordingly, the cutting insert can be stably supported even when a higher cutting resistance is applied toward the portion of the cutting insert farthest away from the axis of the milling cutter. In addition, since the rake angle between the rake face and the plane surface of the upper face of the cutting insert becomes gradually large in a direction going away from the axis of a cutting tool, an angle between the rake face of the cutting insert and a processing surface of a workpiece becomes gradually small. As such, since a cutting resistance applied from a workpiece to the cutting insert can be further offset in a direction going away from the axis of the milling cutter, the difference in the cutting resistance in a lengthwise direction of the cutting edge is reduced and wear of the cutting edge uniformly occurs. This allows a much longer use of one cutting edge.

The invention claimed is:

1. A double-sided cutting insert for a cutting tool, comprising:
   a polygonal upper face having curved edges;
   a lower face having a rotationally symmetrical relation to the upper face;
   a plurality of flank faces for connecting one of the edges of the upper face to a corresponding edge of the lower face, respectively;
   a plurality of upper cutting edges, each of the upper cutting edges being formed on each of the edges of the upper face;
   a plurality of lower cutting edges, each of the lower cutting edges formed on each of the edges of the lower face;
   a plurality of upper chip-forming portions, each upper chip-forming portion having a rake face inclined toward a plane surface of the upper face from the upper cutting edge inwardly of the cutting insert and a plurality of protrusions arranged along an inner boundary of the rake face for deflecting chips; and
   a plurality of lower chip-forming portions, each lower chip-forming portion having a rake face inclined toward a plane surface of the lower face from the lower cutting edge inwardly of the cutting insert and a plurality of protrusions arranged along an inner boundary of the rake face for deflecting chips;
   wherein when the cutting insert is mounted to the cutting tool, a width of the rake face of the upper chip-forming portion adjacent to an edge portion forming a main cutting edge gradually increases in a direction going away from an axis of the cutting tool; and
   wherein a rake angle of the rake face of the upper chip-forming portion gradually increases from a narrower-width portion of the rake face toward a wider-width portion of the rake face.

2. The double-sided cutting insert of claim 1, wherein the rake angle of the rake face of the upper chip-forming portion gradually increases from a narrow-width portion of the rake face toward a wide-width portion of the rake face from 15° to 25°.

3. The double-sided cutting insert of claim 1, wherein the upper and lower faces of the cutting insert have a triangular shape.

4. A milling cutter comprising one or more cutting inserts of claim 1 and a cutter body having pocket portions for mounting the one or more cutting inserts,
   wherein the pocket portion includes a support surface corresponding to a mounting surface of the cutting insert,
   wherein the support surface, at a leading end of the cutter body pocket portion, has a larger area at a portion away from an axis of the cutter body than at a portion adjacent to the axis of the cutter body, and
   wherein the cutting insert is slantingly mounted in a negative direction with respect to the axis of the cutter body.

5. A double-sided cutting insert comprising:
   identical lower and upper polygonal faces, each face having curved edges;
   a through bore extending between the lower and upper faces;
   a plurality of flank faces connecting curved edges of the upper face to corresponding curved edges of the lower face;
   a plurality of cutting edges formed on the curved edges of each face, each cutting edge extending between a first corner edge and a second corner edge, the second corner edge being counterclockwise around the through bore relative to the first corner edge, in a plan view of the cutting insert;
   each face have a plurality of chip-forming portions, each chip-forming portion on the upper face having a rake face inclined toward a plane surface of the upper face from an associated cutting edge inwardly of the cutting insert, each chip-forming portion on the lower face having a rake face inclined toward a plane surface of the lower face from an associated cutting edge inwardly of the cutting insert, and each rake face having a plurality of protrusions arranged along an inner boundary of the rake face for deflecting chips;

wherein:
a width of a rake face associated with a given cutting edge gradually increases in a direction going from the first corner edge to the second corner edge: and
a rake angle of a rake face associated with a given cutting edge gradually increases in a direction going from the first corner edge to the second corner edge.

6. The double-sided cutting insert according to claim 5, wherein the rake angle of each rake face increases from 15° to 25°.

7. The double-sided cutting insert according to claim 5, wherein the upper and lower faces have a triangular shape.

8. The double-sided cutting insert according to claim 5, wherein the cutting insert has a trigonal shape.

9. The double-sided cutting insert according to claim 5, wherein:
a first upper face portion proximate the first corner edge associated with a given cutting edge has a larger surface area than a second upper face portion proximate the second corner edge associated with that same cutting edge; wherein:
the first upper face portion and the second upper face portion are both located between said plurality of protrusions and the through bore of the cutting insert.

10. A milling cutter having a rotational axis and comprising:
a cutter body having at least one pocket portion provided with a support surface for mounting a cutting insert; and
a double-sided cutting insert according to claim 5, having a mounting surface in abutment with the support surface of the pocket portion.

11. The milling cutter according to claim 10, wherein:
the support surface, at a leading end of the at least one pocket portion of the cutter body, has a larger area at a first portion located away from the rotational axis than at a second portion adjacent to the rotational axis; and
the double-sided cutting insert is slantingly mounted in a negative direction with respect to the rotational axis.

* * * * *